United States Patent
Stander et al.

(10) Patent No.: US 9,452,702 B2
(45) Date of Patent: Sep. 27, 2016

(54) SYSTEM AND METHOD FOR PREVENTING POWER HEAD ROLLOVER DURING A DUMP OPERATION BY MONITORING FRONT STRUTS

(71) Applicant: Deere & Company, Moline, IL (US)

(72) Inventors: Francois F. Stander, Dubuque, IA (US); John M. Chesterman, Dubuque, IA (US)

(73) Assignee: Deere & Company, Moline, IL (US)

( * ) Notice: Subject to any disclaimer, the term of this patent is extended or adjusted under 35 U.S.C. 154(b) by 183 days.

(21) Appl. No.: 13/761,282

(22) Filed: Feb. 7, 2013

(65) Prior Publication Data

US 2014/0222299 A1    Aug. 7, 2014

(51) Int. Cl.

| | |
|---|---|
| *G06F 7/70* | (2006.01) |
| *G06F 19/00* | (2011.01) |
| *G06G 7/00* | (2006.01) |
| *G06G 7/76* | (2006.01) |
| *B60P 1/04* | (2006.01) |
| *B60R 22/00* | (2006.01) |
| *E05F 15/00* | (2015.01) |
| *G05D 1/00* | (2006.01) |
| *G05D 3/00* | (2006.01) |
| *G06F 7/00* | (2006.01) |
| *G06F 17/00* | (2006.01) |
| *B60P 1/28* | (2006.01) |
| *B61D 9/00* | (2006.01) |
| *B61D 9/10* | (2006.01) |
| *B65G 67/32* | (2006.01) |

(52) U.S. Cl.
CPC . *B60P 1/04* (2013.01); *B60P 1/045* (2013.01)

(58) Field of Classification Search
CPC .................................. B60P 1/045; B60P 1/04
USPC .......................... 701/49–50; 298/22 R, 17 S
See application file for complete search history.

(56) References Cited

U.S. PATENT DOCUMENTS

| | | | |
|---|---|---|---|
| 7,810,887 B2 | 10/2010 | Hjerth | |
| 2009/0212472 A1* | 8/2009 | Adonakis | B60G 3/20 267/64.21 |
| 2010/0045092 A1* | 2/2010 | Hjerth et al. | 298/17 S |

(Continued)

FOREIGN PATENT DOCUMENTS

WO    WO2006/093438 A1    9/2006

OTHER PUBLICATIONS

Todd, Bob, "700 Family B Series Articulated Truck—An Introduction," brochure, Oct. 2010, Caterpillar Peterlee Marketing, Global Mining Division.

*Primary Examiner* — Helal A Algahaim
*Assistant Examiner* — Mahmoud Ismail
(74) *Attorney, Agent, or Firm* — Taft Stettinius & Hollister LLP (57) ABSTRACT

A system is disclosed for preventing power head rollover of a vehicle during a dump operation. The system includes a dump signal indicating when the vehicle is dumping, a strut sensor reading indicating a condition of the front struts, and a controller receiving the dump signal and strut readings, and activating a warning signal when the dump signal indicates the vehicle is dumping and the strut reading indicates the front wheels may be lifted off the ground. The strut sensors can be height, pressure or other types of sensors. The controller can also disable further lifting of the dump body when the dump signal indicates the vehicle is dumping and the strut sensor indicates the front wheels may be lifted off the ground. The system can include a strut limit, and the controller can act based on comparing the strut reading to the strut limit.

12 Claims, 5 Drawing Sheets

(56) References Cited

U.S. PATENT DOCUMENTS

2012/0239257 A1* 9/2012 Ichinose et al. ............... 701/49
2012/0274121 A1* 11/2012 Minoshima et al. ....... 298/22 R
2014/0129097 A1* 5/2014 Ichinose et al. ................ 701/50

* cited by examiner

SYSTEM AND METHOD FOR PREVENTING POWER HEAD ROLLOVER DURING A DUMP OPERATION BY MONITORING FRONT STRUTS

FIELD OF THE INVENTION

The present invention generally relates to the field of motorized machinery, and more specifically to a system and method for preventing power head rollover of a dump vehicle during a dump operation by monitoring the front struts.

BACKGROUND OF THE INVENTION

A dump vehicle, for example an articulated dump truck (ADT), comprises a power head section and a load-carrying section. The power head section includes a front frame coupled to a vehicle engine, an operator cab and a front wheel axle. The load-carrying section includes a rear frame coupled to a dump body and at least one rear wheel axle. In an ADT, the rear frame is coupled to the front frame by an articulation joint allowing the power head and load-carrying sections to pivot from left to right relative to each other, and by an oscillation joint allowing the power head and load-carrying sections to rotate in relation to one another about an imaginary axis extending longitudinally through the vehicle. The articulation and oscillation joints enable the power head and load-carrying sections to move substantially independently of one another.

For a vehicle that has articulation and oscillation joints coupling a power head section of the vehicle to a load carrying section of the vehicle, the power head section may have a tendency to want to roll over when the front wheels lift off the ground. Although the load-carrying frame may roll over relative to the power head section because of an unbalanced load in a dump body, the power head section is unlikely to roll over relative to the load-carrying section under normal conditions. However if a sticky load is stuck in the dump body, the possibility exists for the center of gravity of the payload to shift behind a pivot axis of the dump vehicle, which could result in the front wheels being lifted off the ground. This is more likely to happen when the machine is dumping a load down an incline. When this happens, the power head section could flip over, or fall on its side. This can be dangerous for the operator, and can result in vehicle damage.

It would be desirable to have a system and method for preventing power head rollovers or providing a warning of potential power head rollovers when a dump vehicle is performing a dumping operation.

SUMMARY

A system is disclosed for preventing power head rollover of a dump vehicle during a dump operation where the dump vehicle includes an operator cab and front wheels coupled to a front frame, a dump body and rear wheels coupled to a rear frame, and front struts coupling the front wheels to the front frame, the front frame being coupled to the rear frame. The system includes a dump operation sensor, a strut sensor and a controller. The dump operation sensor generates a dump signal indicating when the dump vehicle is performing a dump operation. The strut sensor generates a strut sensor reading indicating a condition of the front struts. The controller receives the dump signal and the strut sensor reading, and activates a warning signal when the dump signal indicates that the dump vehicle is performing a dump operation and the strut sensor reading indicates that the front wheels may be lifted off the ground. The strut sensor can be any of various types of sensors, for example a height sensor monitoring the height of the front struts, or a pressure sensor monitoring the downward pressure on the front struts. The controller can also disable further lifting of the dump body when the dump signal indicates that the dump vehicle is performing a dump operation and the strut sensor reading indicates that the front wheels may be lifted off the ground.

The system can include a strut limit, and the controller can compare the strut sensor reading to the strut limit to determine if the strut sensor reading indicates that the front wheels may be lifted off the ground. If the strut sensor is a height sensor monitoring the height of the front struts; the controller can compare the strut sensor reading to a strut height limit, and activate the warning signal when the dump signal indicates that the dump vehicle is performing a dump operation and the strut sensor reading exceeds the strut height limit. If the strut sensor is a pressure sensor monitoring the downward pressure on the front struts, the controller can compare the strut sensor reading to a strut pressure limit, and activate the warning signal when the dump signal indicates that the dump vehicle is performing a dump operation and the strut sensor reading falls below the strut pressure limit.

An articulation joint can couple the front frame to the rear frame of the dump vehicle. The rear wheels of the dump vehicle can include a bogie axle arrangement coupling a first rear axle and wheels to a second rear axle and wheels with a bogie pivot joint between the first and second rear axles, where the bogie pivot joint couples the bogie axle arrangement to the rear frame of the dump vehicle.

An alternative sensor system is disclosed for preventing power head rollover of a dump vehicle during a dump operation where the dump vehicle includes an operator cab and front wheels coupled to a front frame, a dump body and rear wheels coupled to a rear frame, and front struts coupling the front wheels to the front frame, the front frame being coupled to the rear frame. The sensor system includes a dump operation sensor, a strut sensor, first and second strut sensor limits and a controller. The dump operation sensor generates a dump signal indicating when the dump vehicle is performing a dump operation. The strut sensor generates a strut sensor reading indicating a condition of the front struts. The controller receives the dump signal and the strut sensor reading, activates a warning signal when the dump signal indicates that the dump vehicle is performing a dump operation and the strut sensor reading exceeds the first sensor limit, and disables further lifting of the dump body when the dump signal indicates that the dump vehicle is performing a dump operation and the strut sensor reading exceeds the second sensor limit. If the strut sensor is a height sensor monitoring the height of the front struts, and the first and second strut sensor limits are height limits, the first strut sensor limit being less than the second strut sensor limit, then the controller can activate the warning signal when the dump signal indicates that the dump vehicle is performing a dump operation and the strut sensor reading exceeds the first strut sensor limit, and disable further lifting of the dump body when the dump signal indicates that the dump vehicle is performing a dump operation and the strut sensor reading exceeds the second sensor limit. If the strut sensor is a pressure sensor monitoring the downward pressure on the front struts, and the first and second strut sensor limits are pressure limits, the first strut sensor limit being greater than the second strut sensor limit, then the controller can activate the warning signal when the dump signal indicates that the dump vehicle is performing a dump operation and the strut sensor reading is less than the first strut sensor limit, and disable further lifting of the dump body when the dump signal indicates that the dump vehicle is performing a dump operation and the strut sensor reading is less than the second sensor limit.

A method is disclosed for preventing power head rollover of a dump vehicle during a dump operation, where the dump vehicle includes an operator cab and front wheels coupled to a front frame, a dump body and rear wheels coupled to a rear frame, and front struts coupling the front wheels to the front frame, the front frame being coupled to the rear frame. The method includes receiving a dump signal indicating when the dump vehicle is performing a dump operation; receiving a strut sensor reading indicating a condition of the front struts; and activating a warning signal when the dump signal indicates that the dump vehicle is performing a dump operation and the strut sensor reading indicates that the front wheels may be lifted off the ground. The strut sensor readings can be generated be any of various types of sensors, for example a height sensor monitoring the height of the front struts, or a pressure sensor monitoring the downward pressure on the front struts. The method can also include preventing further lifting of the dump body when the dump signal indicates that the dump vehicle is performing a dump operation and the strut sensor reading indicates that the front wheels may be lifted off the ground. The method can also include comparing the strut sensor reading to a strut limit to determine if the strut sensor reading indicates that the front wheels may be lifted off the ground.

The activating a warning signal step can include activating a warning signal when the dump signal indicates that the dump vehicle is performing a dump operation and the strut sensor reading exceeds a first sensor limit. The method can also include disabling further lifting of the dump body when the dump signal indicates that the dump vehicle is performing a dump operation and the strut sensor reading exceeds a second sensor limit. If the strut sensor reading is generated by a height sensor monitoring the height of the front struts, and the first and second strut sensor limits are height limits, the first strut sensor limit being less than the second strut sensor limit, then the activating a warning signal step can include activating a warning signal when the dump signal indicates that the dump vehicle is performing a dump operation and the strut sensor reading exceeds the first sensor limit; and the disabling further lifting of the dump body step can include disabling further lifting of the dump body when the dump signal indicates that the dump vehicle is performing a dump operation and the strut sensor reading exceeds the second sensor limit. If the strut sensor reading is generated by a pressure sensor monitoring the downward pressure on the front struts, and the first and second strut sensor limits are pressure limits, the first strut sensor limit being greater than the second strut sensor limit, then the activating a warning signal step can include activating a warning signal when the dump signal indicates that the dump vehicle is performing a dump operation and the strut sensor reading is less than the first sensor limit; and the disabling further lifting of the dump body step can include disabling further lifting of the dump body when the dump signal indicates that the dump vehicle is performing a dump operation and the strut sensor reading is less than the second sensor limit.

DETAILED DESCRIPTION

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

Figure 1:
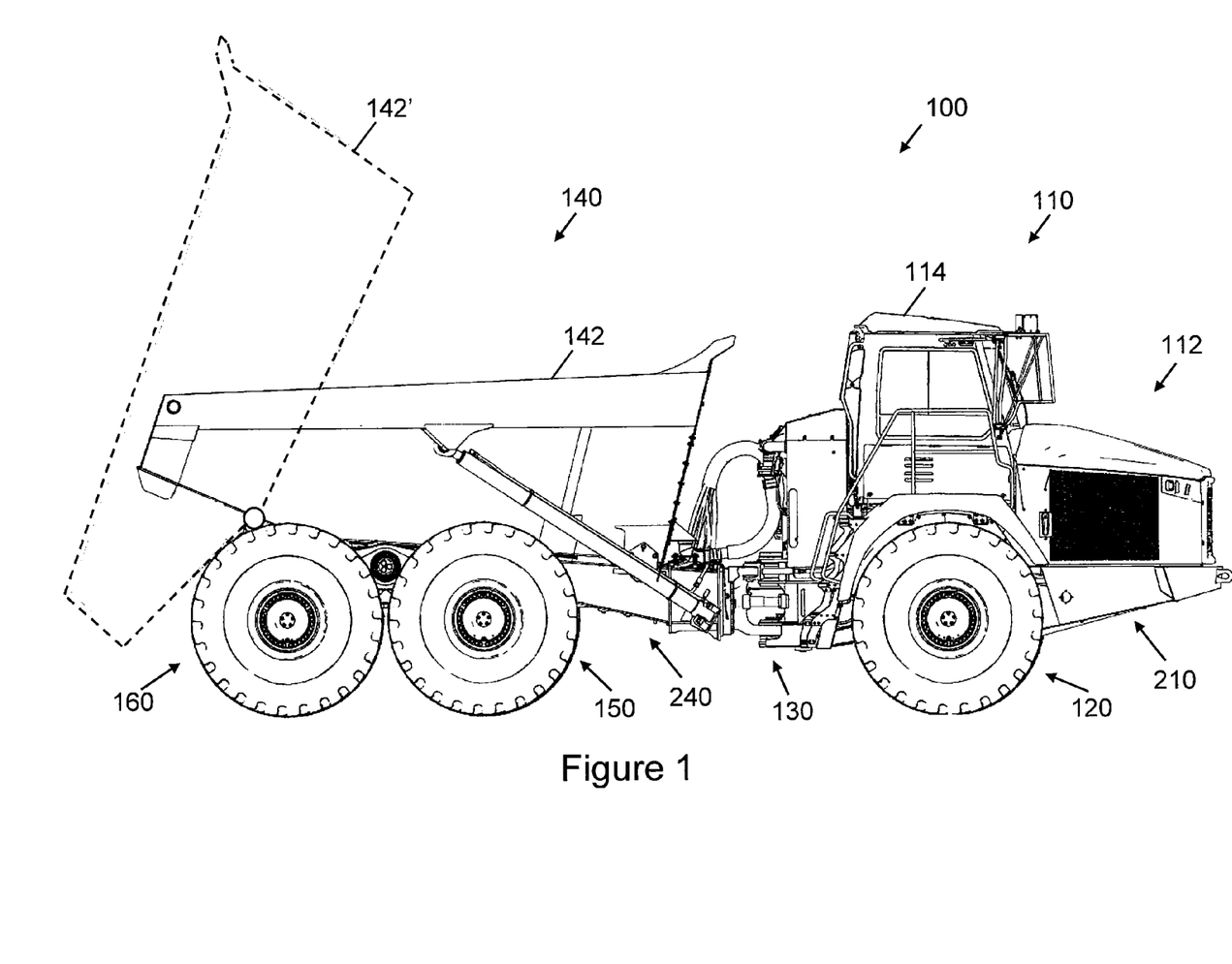
FIG. 1 illustrates an exemplary dump vehicle having a power head section and a load-carrying section.

FIG. 1 illustrates an exemplary dump vehicle 100 including a power head section 110 and a load carrying section 140. The power head section 110 includes a vehicle engine or motor 112, an operator cab 114 and a front axle and wheels 120 which are all coupled to a front frame 210. The load carrying section 140 includes a dump body 142, a first rear axle and wheels 150 and a second rear axle and wheels 160 which are all coupled to a rear frame 240. The front frame 210 of the power head section 110 is coupled to the rear frame 240 of the load carrying section 140 by articulation and oscillation joints 130. The articulation joint enables the power head section 110 and the load carrying section 140 to pivot relative to one another about a vertical axis for steering the vehicle 100, and the oscillation joint allows the power head section 110 and the load carrying section 140 to rotate relative to one another about a longitudinal axis extending along the length of the vehicle 100. The dump body 142 is illustrated with dashed lines as dump body 142' when in the dump position.

Figure 2:
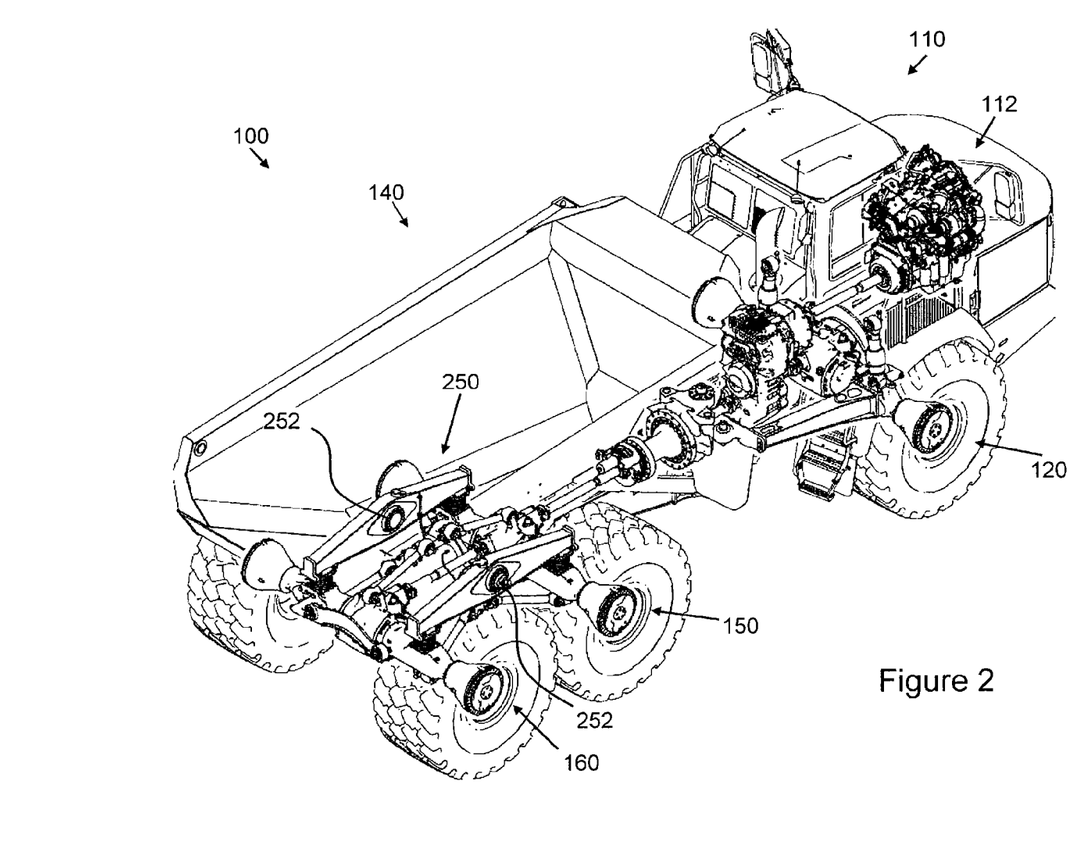
FIG. 2 illustrates an exemplary front and rear axle arrangement for a dump vehicle having a power head section and a load-carrying section.

FIG. 2 illustrates exemplary front and rear axle arrangements for the power head section 110 and load carrying section 140, respectively, of a dump vehicle 100. The exemplary embodiment of FIG. 2 includes a bogie axle arrangement 250 connected to the rear frame 240. In this embodiment, the first rear axle 150 and the second rear axle 160 are connected in the bogie axle arrangement 250, and the bogie axle arrangement 250 is connected by a bogie pivot joint 252 to the rear frame 240. The bogie pivot joint 252 is located between the first rear axle 150 and the second rear axle 160. The bogie pivot joint 252 of the bogie axle arrangement 250 allows the first rear axle 150 and the second rear axle 160 to pivot about an axis running through the bogie pivot joint 252 that is perpendicular to the rear frame 240 which enables the rear axles and wheels 150, 160 to have a different inclination angle than the rear frame 240.

Figure 3:
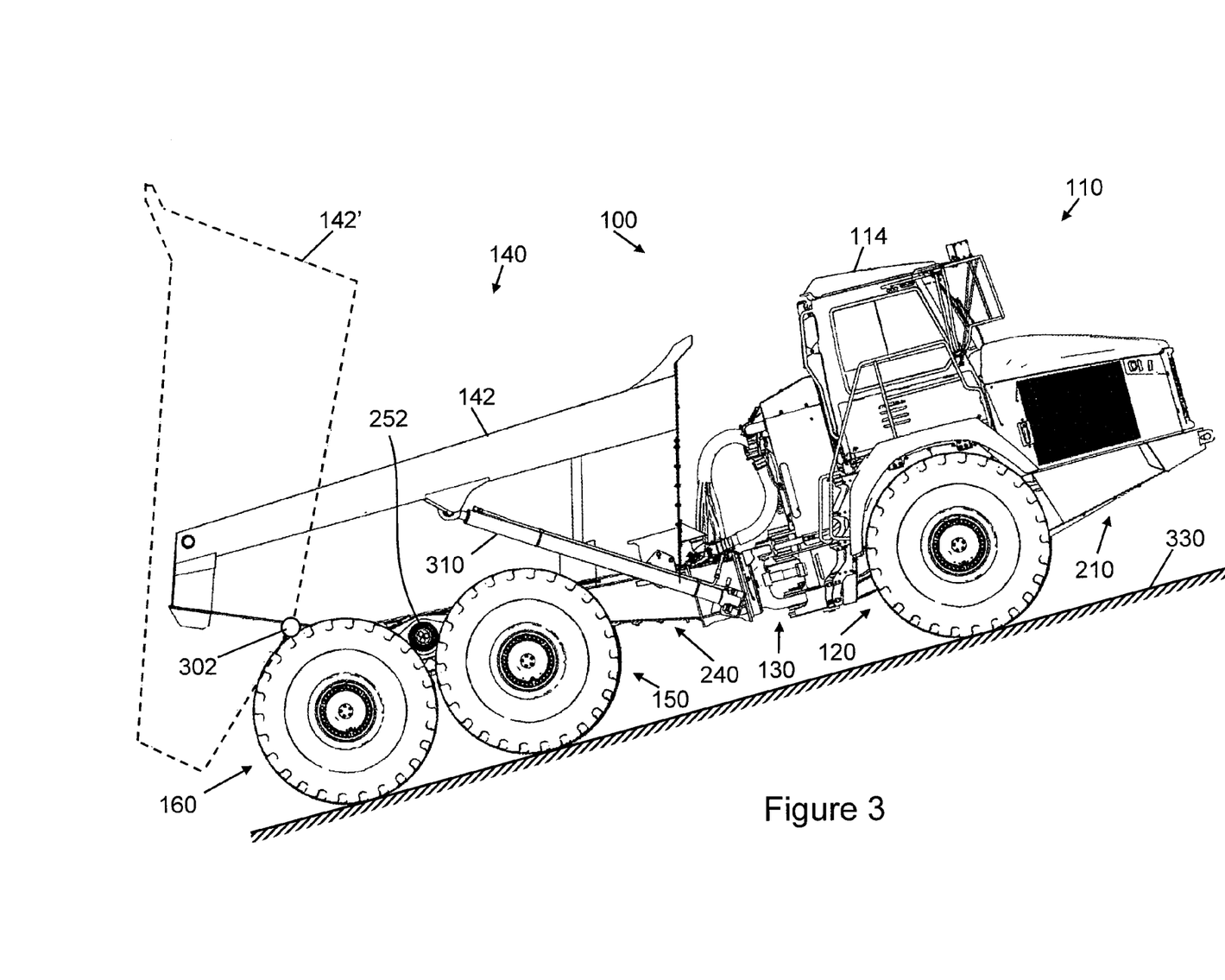
FIG. 3 illustrates a dump vehicle unloading a dump body of its load-carrying section on a sloped terrain.

FIG. 3 illustrates the dump vehicle 100 on a sloped terrain 330, and illustrates the unloading position of the dump body 142' of the load carrying section 140. The dump body 142 is connected to the rear frame 240 by a dump pivot joint 302 and by hydraulic cylinders 310 (one on each side of the dump body 142) which each has a proximal end and a distal end. The dump pivot joint 302 connects the dump body 142 to the rear frame 240 near the distal end of the rear frame 240. The proximal ends of the hydraulic cylinders 310 are connected to the rear frame 240 nearer the proximal end of the rear frame 240 and the distal ends of the hydraulic cylinders 310 are connected to the dump body 142 on each side. The hydraulic cylinders 310 can be extended to pivot the dump body 142 about the dump pivot joint 302 to the dumping position 142' to dump material from the dump body 142'. The hydraulic cylinders 310 can also be retracted to position the dump body 142 along the rear frame 240 to generally maintain material in the dump body 142 of the load carrying section 140.

Under certain conditions, during unloading of material from the dump body 142, the front wheels 120 can be lifted off the ground. For example, the front wheels 120 can be lifted off the ground when the vehicle 100 is on an incline 330 as shown in FIG. 3 and is dumping, positioned at dump body 142', and a load sticks to the dump body 142' with the vehicle 100 angled so that the power head section 110 faces up the incline 330. It is also possible for this to happen when a load is stuck to the dump body 142 during dumping, when positioned at dump body 142', even on level ground as shown in FIG. 1, or when other conditions occur where the center of gravity of the payload shifts back behind the bogie axle 252. When the center of gravity of the payload shifts behind the bogie axle 252, the distal end of the rear frame 240 (furthest from the articulation joint 130) pivots down behind the bogie pivot axle 252 and the second rear axle 160 which lifts the proximal end of the rear frame 240 (closest to the articulation joint 130) which can lift the power head section 110 which lifts the front axle and wheels 120 off the ground. Since the power head section 110 is connected to the load carrying section 140 by the articulation joint 130, when the front wheels 120 lift off the ground, the power head section 110 and operator cab 114 can flip over or fall on their side which can be dangerous for the operator, and can result in damage to the vehicle 100.

Figure 4:
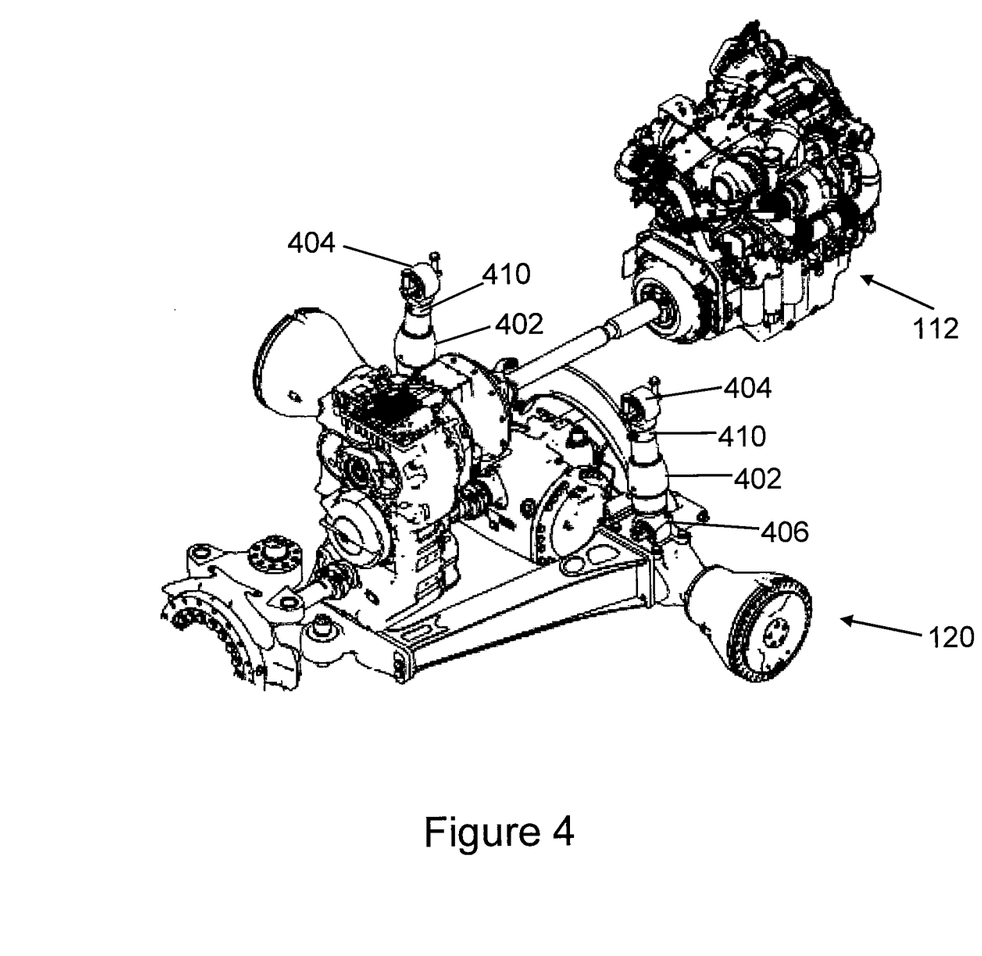
FIG. 4 illustrates an exemplary front strut and sensor for a dump vehicle.

FIG. 4 illustrates front struts 402 and front strut sensors 410. Each of the front struts 402 has a proximal end 404 and a distal end 406. The front struts 402 are part of the suspension system of the power head section 110 of the vehicle 100, the distal end 406 of the front struts 402 being attached to the front axle 120 and the proximal end 404 of the front struts 402 being attached to the front frame 210. The front struts 402 are compressed by the weight of the components of the power head section 110 on the front axle 120, and the front struts 402 are extended when the weight of the components of the power head section 110 are lifted off the front axle 120.

The front strut sensors 410 can be suspension height sensors that monitor the height or length of the front struts 402 during a dump operation and a sensor control system can monitor the readings from the front strut sensors 410. The sensor control system can also receive a dump operation signal that indicates when the vehicle 100 is performing a dump operation with the dump body 142' lifted by hydraulic cylinders 310. A visual, audible or tactile warning signal can be activated to alert the operator when the front strut sensors 410 indicate that the height of the front struts 402 are substantially at or near full extension during a dump operation, which could indicate that the front wheels 120 are about to leave the ground. A strut extension limit can be included in the sensor control system and the warning signal can be activated when the front strut sensors 410 indicate that the height of the front struts 402 have reached the strut extension limit during a dump operation. In addition to or instead of the operator warning, the sensor control system could prevent further raising of the dump body 142 by the hydraulic cylinders 310 when the front strut sensors 410 indicate that the front struts 402 are fully extended or have reached the strut extension limit during a dump operation.

Alternatively, the front strut sensors 410 can be pressure sensors that monitor the pressure or weight on the front struts 402 during a dump operation and a sensor control system can monitor the readings from the front strut sensors 410. The sensor control system can also receive a dump operation signal that indicates when the vehicle 100 is performing a dump operation with the dump body 142' lifted by hydraulic cylinders 310. A visual, audible or tactile warning signal can be activated to alert the operator when the front strut sensors 410 indicate that there is little or no weight on the front struts 402 during a dump operation, which could indicate that the front wheels 120 are about to leave the ground. A strut pressure limit can be included in the sensor control system and the warning signal can be activated when the front strut sensors 410 indicate that the pressure on the front struts 402 has reached the strut pressure limit during a dump operation. In addition to or instead of the operator warning, the sensor control system could prevent further raising of the dump body 142 by the hydraulic cylinders 310 when the front strut sensors 410 indicate that there is little or no weight on the front struts 402, or the pressure on the front struts 402 has reached the strut pressure limit during a dump operation.

Figure 5:
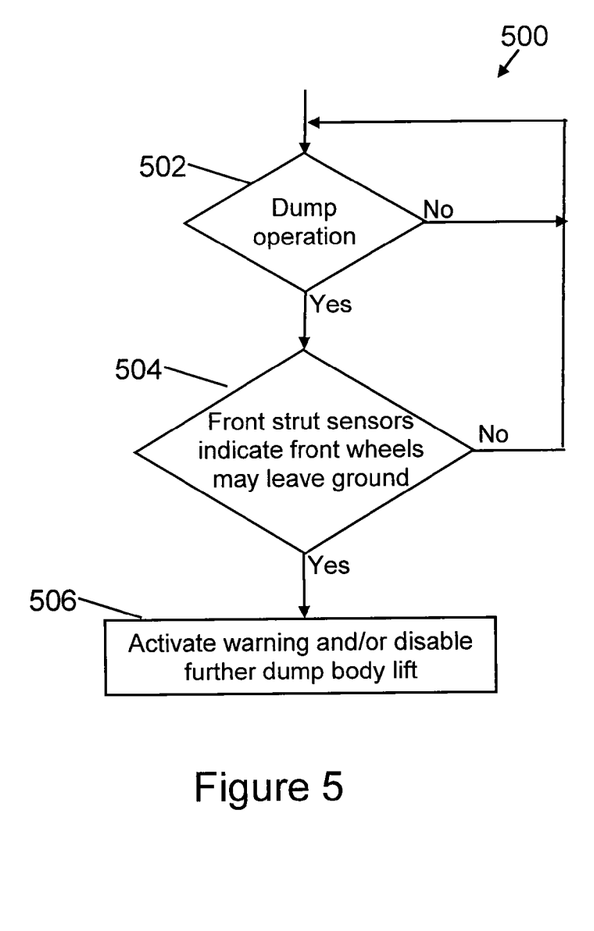
FIG. 5 illustrates an exemplary method of preventing power head rollovers or warning of potential power head rollovers.

FIG. 5 provides an exemplary method 500 for preventing a power head rollover or warning of a potential power head rollover. At step 502, the system waits until a dump operation signal indicates that the vehicle is performing a dump operation. If the system is performing a dump operation, then at step 504 the system checks if one or both of the front strut sensors indicate that the front wheels may leave the ground. The front strut sensors can be any of various types of sensors, including for example the suspension height sensors or pressure sensors described above, that can monitor one or more parameters of the front struts of the vehicle to determine if the front wheels are potentially near lifting off the ground. If the system detects that one or both of the front strut sensors indicate that the front wheels may leave the ground during a dump operation, then the system activates warning signals and/or disables further lifting of the dump body 142. The system may determine whether the front strut sensors indicate that the front wheels may leave the ground during a dump operation based on sensor limits or thresholds, and activate the warning signals and/or disable further lifting of the dump body 142 when the strut sensor readings exceed the sensor limits or thresholds, either greater than (for example height sensors) or less than (for example pressure sensors) as appropriate. The system and method may include first and second sensor limits, where the system activates warning signals when the strut sensor readings exceed the first sensor limit and disables further lifting of the dump body 142 when the strut sensor readings exceed the second sensor limit.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains.

We claim:

1. A system for preventing power head rollover of a dump vehicle during a dump operation, the dump vehicle including an operator cab and front wheels coupled to a front frame, a dump body and rear wheels coupled to a rear frame, and front struts coupling the front wheels to the front frame, the front frame being coupled to the rear frame, the system comprising:
   a dump operation sensor generating a dump signal indicating when the dump vehicle is performing a dump operation;
   a front strut height sensor generating a front strut height reading indicating a height of the front struts;
   a first front strut height limit;
   a second front strut height limit, the second front strut height limit being greater than the first front strut height limit;
   a controller configured to receive the dump signal and the front strut height reading;
   wherein when the front strut height reading is less than the first front strut height limit, the controller does not activate a warning signal or disable lifting of the dump body;
      when the dump signal indicates that the dump vehicle is performing a dump operation and the front strut height reading exceeds the first front strut height limit and is less than the second front strut height limit, the controller activates the warning signal but does not disable further lifting of the dump body; and
      when the dump signal indicates that the dump vehicle is performing a dump operation and the front strut height reading exceeds the second front strut height limit, the controller activates the warning signal and disables further lifting of the dump body.

2. The system for preventing power head rollover of claim 1, wherein an articulation joint couples the front frame to the rear frame of the dump vehicle.

3. The system for preventing power head rollover of claim 2, wherein the rear wheels of the dump vehicle comprise a bogie axle arrangement coupling a first rear axle and wheels to a second rear axle and wheels with a bogie pivot joint between the first and second rear axles, the bogie pivot joint coupling the bogie axle arrangement to the rear frame of the dump vehicle.

4. A system for preventing power head rollover of a dump vehicle during a dump operation, the dump vehicle including an operator cab and front wheels coupled to a front frame, a dump body and rear wheels coupled to a rear frame, and front struts coupling the front wheels to the front frame, the front frame being coupled to the rear frame, the system comprising:
   a dump operation sensor generating a dump signal indicating when the dump vehicle is performing a dump operation;
   a front strut pressure sensor generating a front strut pressure reading indicating a downward pressure on the front struts;
   a first front strut pressure limit;
   a second front strut pressure limit, the first front strut pressure limit being greater than the second front strut pressure limit; and
   a controller configured to receive the dump signal and the front strut pressure reading; wherein when the front strut pressure reading is greater than the first front strut pressure limit, the controller does not activate a warning signal or disable lifting of the dump body;
      when the dump signal indicates that the dump vehicle is performing a dump operation and the front strut pressure reading is less than the first front strut pressure limit and is greater than the second front strut pressure limit, the controller activates the warning signal but does not disable further lifting of the dump body; and
      when the dump signal indicates that the dump vehicle is performing a dump operation and the front strut pressure reading is less than the second front strut pressure limit, the controller activates the warning signal and disables further lifting of the dump body.

5. The system for preventing power head rollover of claim 4, wherein an articulation joint couples the front frame to the rear frame of the dump vehicle.

6. The system for preventing power head rollover of claim 5, wherein the rear wheels of the dump vehicle comprise a bogie axle arrangement coupling a first rear axle and wheels to a second rear axle and wheels with a bogie pivot joint between the first and second rear axles, the bogie pivot joint coupling the bogie axle arrangement to the rear frame of the dump vehicle.

7. A method for preventing power head rollover of a dump vehicle during a dump operation, the dump vehicle including an operator cab and front wheels coupled to a front frame, a dump body and rear wheels coupled to a rear frame, and front struts coupling the front wheels to the front frame, the front frame being coupled to the rear frame, the method comprising:
   receiving a dump signal indicating when the dump vehicle is performing a dump operation;
   receiving a front strut sensor reading indicating a condition of the front struts;
   comparing the front strut sensor reading to first and second front strut sensor limits;
   not activating a warning signal or preventing further lifting of the dump body when the front strut sensor reading is less than the first front strut sensor limit;
   activating the warning signal but not preventing further lifting of the dump body when the dump signal indicates that the dump vehicle is performing a dump operation and the front strut sensor reading exceeds the first front strut sensor limit and does not exceed the second front strut sensor limit; and
   activating the warning signal and preventing further lifting of the dump body when the dump signal indicates that the dump vehicle is performing a dump operation and the front strut sensor reading exceeds the second front strut sensor limit.

8. The method for preventing power head rollover of claim 7, wherein the front strut sensor reading is generated by a height sensor monitoring a height of the front struts.

9. The method for preventing power head rollover of claim 7, wherein the front strut sensor reading is generated by a pressure sensor monitoring a downward pressure on the front struts.

10. The method for preventing power head rollover of claim 7, wherein the front strut sensor reading exceeding the first front strut sensor limit indicates a first risk that the front wheels are being lifted off the ground, and the front strut sensor reading exceeding the second front strut sensor limit indicates a second risk that the front wheels are being lifted off the ground, the second risk being greater than the first risk.

11. The method for preventing power head rollover of claim 7, wherein the front strut sensor reading is generated by a height sensor monitoring a height of the front struts, the first and second front strut sensor limits being height limits, the first front strut sensor limit being less than the second front strut sensor limit, and wherein the activating the warning signal but not preventing further lifting of the dump body step comprises activating the warning signal when the dump signal indicates that the dump vehicle is performing a dump operation and the front strut sensor reading exceeds the first front strut sensor limit and does not exceed the second front strut sensor limit; and wherein the activating the warning signal and preventing further lifting of the dump body step comprises continuing to activate the warning signal and preventing further lifting of the dump body when the dump signal indicates that the dump vehicle is performing a dump operation and the front strut sensor reading exceeds the second front strut sensor limit.

12. The method for preventing power head rollover of claim 7, wherein the front strut sensor reading is generated by a pressure sensor monitoring a downward pressure on the front struts, the first and second front strut sensor limits being pressure limits, the first front strut sensor limit being greater than the second front strut sensor limit, and wherein the activating the warning signal but not preventing further lifting of the dump body step comprises activating the warning signal when the dump signal indicates that the dump vehicle is performing a dump operation and the front strut sensor reading is less than the first front strut sensor limit and is not less than the second front strut sensor limit; and wherein the activating the warning signal and preventing further lifting of the dump body step comprises continuing to activate the warning signal and preventing further lifting of the dump body when the dump signal indicates that the dump vehicle is performing a dump operation and the front strut sensor reading is less than the second front strut sensor limit.

\* \* \* \* \*